Sept. 20, 1960 D. H. RHINE 2,953,358
PROCESS AND APPARATUS FOR HOMOGENEOUS MIXING
Filed Aug. 3, 1956

INVENTOR
David H. Rhine
BY Stevens, Davis, Miller & Mosher
ATTORNEYS

United States Patent Office 2,953,358
Patented Sept. 20, 1960

2,953,358
PROCESS AND APPARATUS FOR HOMOGENEOUS MIXING

David H. Rhine, Terrell, Tex., assignor to Texas Instruments Incorporated, Dallas, Tex., a corporation of Delaware Filed Aug. 3, 1956, Ser. No. 602,024

5 Claims. (Cl. 259—1)

This invention relates to a method and apparatus for producing homogeneous mixtures of pulverulent or granular materials varying in particle size and apparent density. More particularly, it relates to a process and apparatus of cyclic continuous blending of pulverulent or granular materials by dividing the materials into streams and recombining the streams to effect a mixing of the materials in a continuous manner.

In conventional type mixers and blenders, materials are normally mixed by agitation, stirring, tumbling or rotating in drums having spill baffles in an effort to produce a homogeneous blending. These methods of blending, however, do not produce a high degree of homogeneity, particularly where the specific surfaces and apparent densities vary to any degree, for there is a tendency for the material to stratify as the larger particles accumulate together.

In order to overcome these disadvantages, this invention contemplates the continuous dividing of a flow of granular material into a plurality of streams as the material is fed from a hopper located in the interior of a rotary drum. Each stream of material is gravitated over a downwardly and outwardly inclined surface and deposited in pockets in the bottom of the rotary drum. The pockets are formed by angular baffles evenly spaced around the inner periphery of the drum, so that materials deposited therein are elevated and spill near the top of the drum into the hopper where the cycle is repeated. Continuous cycling of the material by dividing the flow of material, gravitating it over an outwardly inclined, spreading surface, and recombining it results in an intimate mixing of the various particles to provide the homogeneous mixture of materials regardless of their varying particle size and density.

An object of this invention is to provide a method and apparatus for producing intimate blending of pulverulent or granular materials, varying in specific surfaces and apparent density, by allowing the materials to flow from a hopper and be split into a plurality of streams which gravitate over an inclined, flat, downwardly and outwardly directed surface so as to direct each stream into the bottom of an elevating mechanism at different points from which the material is elevated and spilled into the hopper at the top of its flight, and again passed through the same operation.

A further object of this invention is to produce an intimate mixing apparatus whereby materials varying in specific surface and apparent density can be quickly and easily separated into portions and recombined to produce a homogeneous mixture.

A still further object is to elevate materials in a rotary drum and allow them to be divided into a plurality of streams, passing the streams over inclined surfaces and directing each stream into the bottom of the rotary drum where the material is again lifted and split into a plurality of streams to effect homogeneous mixing.

Additional objects will become apparent from an examination of the drawings, specification and claims.

The invention will be described further in connection with the accompanying drawings, which are to be considered as an exemplification of the invention and do not constitute limitations thereof.

Figure 1:
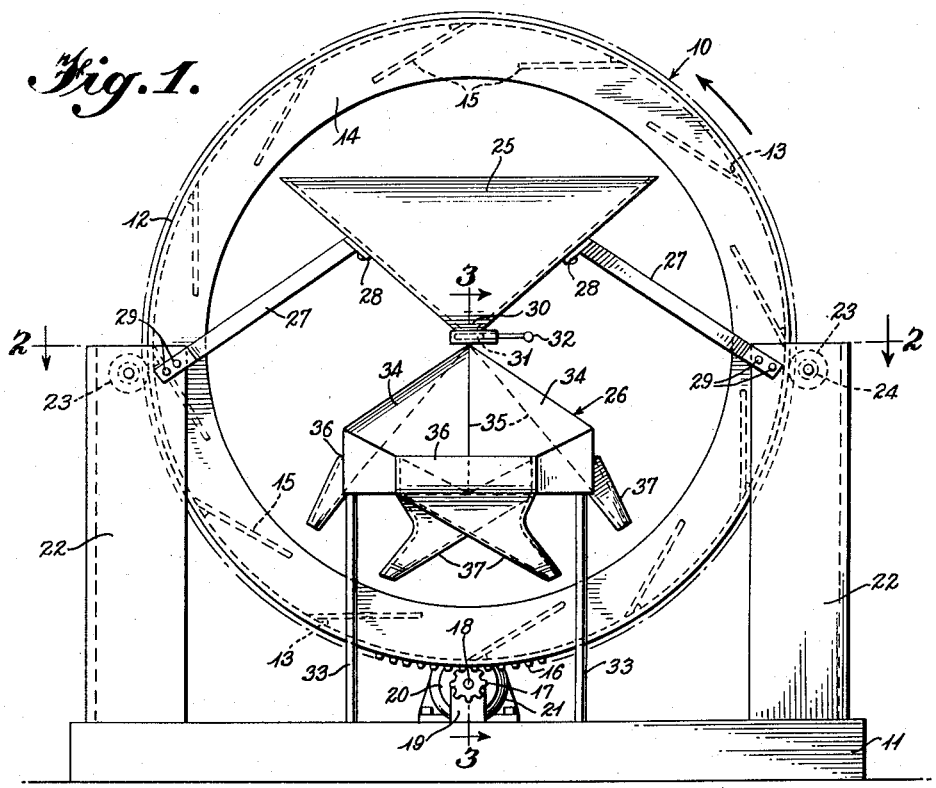
Figure 1 is a side elevational view showing the rotating drum having lifting baffles therein and the hopper and divider arrangements for splitting the flow of materials gravitating from the hopper.
Figure 2:
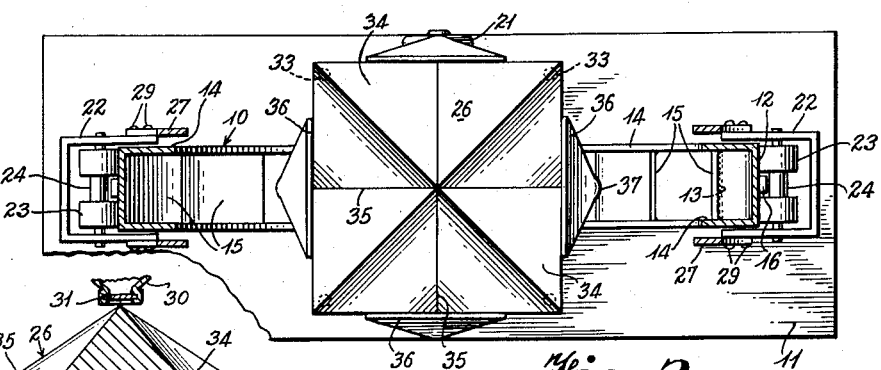
Figure 2 is a sectional plan view, along the line 2—2 of Figure 1, showing the trunnion arrangement for supporting the lifting drum and a plan view of the flow divider.
Figure 3:
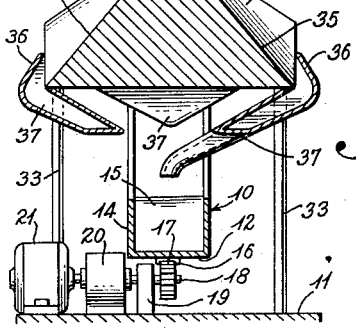
Figure 3 is a fragmentary sectional view, along the line 3—3 of Figure 1, showing a side of the outwardly and downwardly directed V-shaped surfaces for carrying the materials from the hopper to the rotating drum.

The invention will be described in detail in connection with the accompanying drawings in which Figure 1 shows a drum type mixing mechanism 10 supported on a base 11. A narrow rotary drum 12 is provided with inwardly turned sides 14 to form an annulus having an inwardly-turned channel section. At an angle with the point of tangency of the inner periphery of the drum 12 are welded equally spaced baffles 15. These baffles are held in place by welds 13 to the sides 14 and bottom of the drum 12 to form around the inner periphery of the drum a series of angular lift pockets for elevating the materials in the bottom of the drum to the top portion where the materials are spilled out of the pockets, flowing gradually over the angular baffles.

The outer periphery of the drum has affixed thereto a continuous ring gear 16, centrally positioned with respect to the outer face of the drum so that a flat, ring section is provided on both sides of the ring gear to provide a rolling surface as the drum is rotated. Ring gear 16 is operatively connected to drive pinion 17 which supplies the driving force for rotating the drum. Drive pinion 17 is mounted on an outboard shaft 18 which passes through a pillar block 19 and is coupled with a gear reduction unit 20. The gear reduction unit 20 is in turn coupled to a drive motor 21 which supplies the motivating power for driving the gear drive mechanism.

Two vertical, channel-shaped members 22, spaced apart, are centered on base 11 having the open end of each channel facing each other. The channels are secured to the base so as to form a rigid structure for holding the rotary drum 12. In the top of each column is located a set of trunnions 23 spaced apart by a collar 24 so as to provide a gap in which the ring gear 16 can pass during rotation while the trunnions 23 roll against the outer periphery of the drum as the drum is driven by the drive gear 17 in mesh with the driven gear 16.

In the interior of the drum 12 is positioned a conical shaped hopper 25 near the top of the drum and a material flow divider 26 directly below the hopper. The hopper is supported by brace arms 27, the arms being fastened at one end by brackets 28 to the hopper and at the other end by bolts 29 to the vertical columns 22 to form a rigid structure. This positioning of the hopper with respect to the upright columns places the open end of the conical shaped hopper centrally under the top of the rotating drum and the exit end 30 of the hopper directed downwardly along the centerline of the rotating drum.

At the exit end 30 of the hopper is a control valve 31 having a handle 32 for manipulating the opening in the exit end of the hopper so as to control the rate of flow of material gravitating from the hopper. Directly under the center of flow from the exit end of the hopper is the flow divider supported by four equally spaced legs 33 which are secured at one end to the base 11 and at the other end to the under side of the flow divider. The flow divider straddles the annulus of the rotating drum so that the hopper and divider represent stationary members with respect to the rotating drum. Flow divider 26 is in the pyramidal form, having donwardly sloping faces 34. Each face 34 has flat, inwardly sloping sides which form a groove 35 following the centerline of the face from the apex of the pyramidal section at the top to a point below the base. This arrangement provides a V-shaped or trough-shaped face so that material flowing down one side of the pyramid is caused to spread out and then collect at the bottom of the groove to effect efficient mixing.

Two opposite faces of the pyramid lie in the plane of the drum while the other two faces lie in a plane perpendicular to the plane of the drum. At the bottom of the V-shaped groove 35 is a pocket arrangement 36 having a spout 37. Each pocket and spout collecting material from each face directs the material into a different portion of the bottom of the drum, thereby spreading the divided flows at four different points during the rotation of the drum.

In operation, the pulverulent or granular materials, differing in specific surface and apparent density, are conveyed into hopper 25 with the valve 31 in a closed position. The rotating drum 12 is set in motion through drive pinion 17 and the drum is slowly rotated by rolling on the trunnions 23. The valve 31 is opened by slide handle 32 to permit the desired flow of material to gravitate downwardly over the flow divider 26 where it is split into four streams. Each of the four streams flows over one of the faces of the divider and is recollected at the bottom of the divider where the material from each face is deposited into a different one of the lift pockets at the bottom of the rotating drum. Each lift pocket on the drum receives material from each of the spouts 37. Rotation of the drum elevates the material to the top thereof and spills it into the stationary hopper where the dividing process is repeated. The continuous rotation of the drum, elevating the divided material and recombining it by spilling it into the hopper, brings about a homogeneous mixing of the materials, varying in specific surface and apparent density, heretofore found difficult to blend.

As a specific example of the practice of this invention, granular materials differing in apparent density and specific surface were placed in the hopper. The material was dumped in at random until the hopper was about three-quarters full. At this point the drum was placed in operation so that is was rotating at about ten revolutions per minute. The valve in the bottom of the hopper was then opened to allow the material to gravitate over the flow divider and separate into four individual streams. The valve was controlled so as to allow the material to flow at a sufficient rate to effect a mixing of the particles traversing the faces of the divider. The materials flowed in a steady and even manner and were deposited in the bottom section of the rotating drum. As the hopper emptied, more material was placed in it until the drum began to spill materials deposited in the bottom into the hopper. After one hour of mixing, the product was removed from the blending operation by diverting the flow coming out of the spouts. The product was found to be thoroughly mixed, showing no stratification of like particles.

It was found that by enlarging the opening of the valve to allow a greater flow of material over the faces of the divider and by operating the drum at a higher rate of rotation, a high degree of mixing was produced over a shorter period of time, and the product so produced was found to be thoroughly mixed, showing no stratification of like particles.

The angles of the sloping faces of the divider section may be varied without materially changing the degree of mixing so long as they allow the particles gravitating to traverse an angle which is greater than the angle of repose of any of the particles being passed over the inclined surfaces. It has been found that angles between 30° and 45° generally produce favorable results.

Although the invention has been illustrated using a divider having four faces, it is to be understood that a plurality of faces may be used to produce homogeneous mixing without departing from the spirit and scope of this invention.

What is claimed is:

1. An apparatus for homogeneous mixing of pulverulent or granular material comprising a rotary drum having lifting baffles therein for elevating and dropping said material, a hopper located in the interior of said drum with the entrance section of the hopper positioned to receive said material from said baffles, a control valve located in the bottom section of said hopper for controlling the rate of flow of material from said hopper, a plurality of inclined faces forming an apex directly under said valve, each face having a groove therein running downwardly from said apex, a collector at the bottom of each said groove for collecting material flowing downwardly in said groove, and means for directing said collected material from each collector separately into said rotary drum.

2. An apparatus as claimed in claim 1 in which said plurality of inclined faces being joined together to form a unitary closed pyramid, which is employed to divide the flow of said material.

3. Apparatus for homogeneously mixing granular material comprising a hopper for holding a supply of said granular material; means for controlling the discharge of said material from said hopper; means including a plurality of downwardly and outwardly inclined surfaces for dividing said material from said hopper into a plurality of streams, each of said streams gravitating outwardly and downwardly in a different direction over said inclined surfaces; conveyor means having a plurality of pockets thereon for receiving and conveying said material to said hopper; and collecting means for individually collecting said streams after said streams have passed over said inclined surfaces and for directing said material from said collected streams sequentially into each of said pockets.

4. Apparatus for homogeneous mixing of granular material comprising a hopper for holding a supply of said material; means for controlling discharge of said material from said hopper; means including a plurality of inclined surfaces for dividing said material from said hopper into a plurality of streams, each stream gravitating outwardly over a different one of said inclined surfaces; means for individually collecting said streams after said streams have passed over said inclined surfaces; conveyor means for transporting said material to said hopper; and means for directing each collected stream to said conveyor means to be transported back to said hopper.

5. A method of mixing heterogeneous granular material, comprising: continuously flowing said material from a starting point, dividing said material into separate streams flowing in a downward and outward direction, redirecting in time sequence incremental portions from all of said streams into partially mixed piles of said material, each pile having received an incremental portion from each of said streams, and individually elevating the piles of said material to the starting point and repeating the process until a homogeneous material is produced.

References Cited in the file of this patent

UNITED STATES PATENTS

| | | |
|---|---|---|
| 1,496,896 | Laffoon | June 10, 1924 |
| 1,810,410 | Alldredge | June 16, 1931 |
| 2,091,772 | Steele | Aug. 31, 1937 |
| 2,583,135 | Bakker | Jan. 22, 1952 |